(12) United States Patent
Jepperson et al.

(10) Patent No.: US 12,143,429 B1
(45) Date of Patent: Nov. 12, 2024

(54) DYNAMIC CONTEXT ORCHESTRATION BASED USER EXPERIENCE

(71) Applicant: INTERNATIONAL BUSINESS MACHINES CORPORATION, Armonk, NY (US)

(72) Inventors: Jacob Ryan Jepperson, St. Paul, MN (US); Melanie Dauber, Oceanside, NY (US); Jeremy R. Fox, Georgetown, TX (US); Logan Bailey, Atlanta, GA (US); Zachary A. Silverstein, Georgetown, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 18/447,395

(22) Filed: Aug. 10, 2023

(51) Int. Cl.
*H04L 65/1069* (2022.01)
*G10L 15/26* (2006.01)
*H04L 9/32* (2006.01)

(52) U.S. Cl.
CPC .......... *H04L 65/1069* (2013.01); *G10L 15/26* (2013.01); *H04L 9/3213* (2013.01)

(58) Field of Classification Search
CPC .... H04L 65/1069; H04L 9/3213; G10L 15/26
See application file for complete search history.

(56) References Cited

U.S. PATENT DOCUMENTS

| | | | |
|---|---|---|---|
| 7,385,479 B1 | 6/2008 | Green | |
| 10,187,337 B2 | 1/2019 | Smullen | |
| 10,430,817 B2 | 10/2019 | Wilkinson | |
| 10,904,384 B2 | 1/2021 | Dahan | |
| 11,032,421 B2 | 6/2021 | Karp | |
| 11,586,754 B2 | 2/2023 | Naqvi | |
| 2013/0066740 A1 | 3/2013 | Ouimet | |
| 2017/0300936 A1 | 10/2017 | Wilkinson | |
| 2017/0300944 A1* | 10/2017 | Wilkinson | G06F 16/288 |
| 2018/0343309 A1* | 11/2018 | Mishra | H04L 63/0861 |

(Continued)

OTHER PUBLICATIONS

Grinyer, "Designing Blockchain enabled customer experiences for new digital services", 22nd DMI: Academic Design Management Conference—Impact the Future by Design, Aug. 5-6, 2020, 14 pgs.

(Continued)

*Primary Examiner* — William G Trost, IV
*Assistant Examiner* — Monishwar Mohan
(74) *Attorney, Agent, or Firm* — Lily Neff

(57) ABSTRACT

A method, computer system, and a computer program product are provided for restoring an interrupted communication session. In one embodiment, the methodology comprises obtaining communication interface and network information from a user required to communicate from a user device with another device. The user communication is then captured between a current session using the user device and another device. The context of the captured communication is then determined, and a token is associated with it. The information relating to the current session and its context as well as the associated token are stored. This stored information is used to re-establish a new session when the current session is terminated or interrupted prior to resolution. The new session uses the stored information to reestablish communication at the exact process stage where interruption occurred.

20 Claims, 3 Drawing Sheets

(56) References Cited

U.S. PATENT DOCUMENTS

2019/0385155 A1* 12/2019 Silverman ............ G06Q 20/367
2020/0374394 A1* 11/2020 Karp ........................ G06F 9/54
2021/0076204 A1*  3/2021 Goyal .................. H04L 67/306
2023/0368262 A1* 11/2023 Kumar ............... G06Q 30/0629

OTHER PUBLICATIONS

IBM, "IBM Support Guide", IBM.com, [Accessed Jul. 21, 2023], 42 pgs., Retrieved from the Internet: <https://www.ibm.com/support/pages/ibm-support-guide>.

McMurtry, "Information Retrieval for Call Center Quality Assurance", Thesis, The Ohio State University, 2020, 42 pgs.

Meyerson et al., "Improving the User Experience of Professional Researchers: Applying a User-centered Design Framework in Archival Repositories", Proceedings of the American Society for Information Science and Technology, vol. 49, Issue 1, Jan. 24, 2013, pp. 1-7.

* cited by examiner

DYNAMIC CONTEXT ORCHESTRATION BASED USER EXPERIENCE

BACKGROUND

The present invention relates generally to the field of data management and more particularly to techniques for providing context-based user experiences in a dynamic computing environment.

Chatbots may be defined as any software application that aims to mimic human interactions. They can vary in sophistication and provide a variety of functions. For example, they may provide text to voice conversions and be initiated online or through other electronic means. Many chatbots include artificial intelligence engines that include machine language models.

Traditionally, a primary device may be used to communicate and interface with chatbots. However, the primary device that initiates or supports a chatbot communication may be varied. This primary device may include a mobile device, a desktop, a smart phone, or a variety of other electronic devices. In some embodiments, the primary devices may be used to establish a customer support session such as between a user and a service, starting with a chatbot interface. One challenge in initiating a customer support system with a chatbot may be long wait times prior to the beginning of the session. To compound this problem, the primary device may have to be switched on and off to complete the interaction. Unfortunately, however, the latter may also result in interrupted connections that in turn may require the process to be restarted from the beginning. The unexpected disruption, especially in the midst of an intricate interaction, will often lead to adverse effects.

SUMMARY

Embodiments of the present invention disclose a method, computer system, and a computer program product for restoring an interrupted communication session. In one embodiment, the methodology comprises obtaining from a user communication interface and network information required for the user to communicate from a user device with another device. The user communication is then captured between a current session using the user device and another device. The context of the captured communication is then determined, and a token is associated with it. The information relating to the current session and its context as well as the associated token are stored. This stored information is used to re-establish a new session when the current session is terminated or interrupted prior to resolution. The new session uses the stored information to reestablish communication at the exact process stage where interruption occurred.

BRIEF DESCRIPTION OF THE SEVERAL VIEWS OF THE DRAWINGS

These and other objects, features and advantages of the present invention will become apparent from the following detailed description of illustrative embodiments thereof, which may be to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
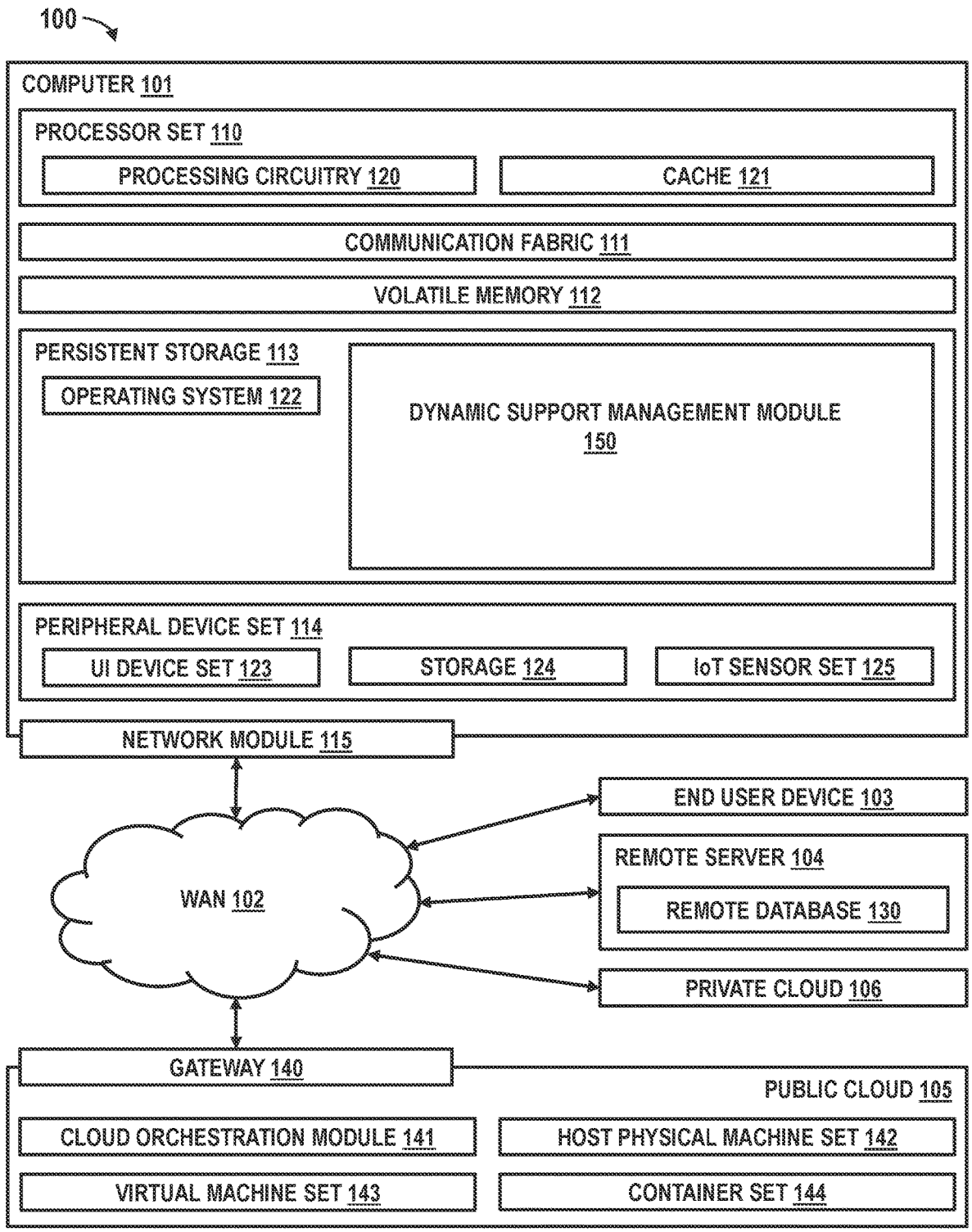
FIG. 1 illustrates a networked computer environment, according to at least one embodiment.

Detailed embodiments of the claimed structures and methods may be disclosed herein; however, it can be understood that the disclosed embodiments may be merely illustrative of the claimed structures and methods that may be embodied in various forms. This invention may, however, be embodied in many different forms and should not be construed as limited to the exemplary embodiments set forth herein. Rather, these exemplary embodiments may be provided so that this disclosure will be thorough and complete and will fully convey the scope of this invention to those skilled in the art. In the description, details of well-known features and techniques may be omitted to avoid unnecessarily obscuring the presented embodiments.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 1 provides a block diagram of a computing environment 100. The computing environment 100 contains an example of an environment for the execution of at least some of the computer code involved in performing the inventive methods, such as code change differentiator which is capable of providing a dynamic support management module (150). In addition to this module 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and module 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 of FIG. 1 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in module 150 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in module 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers.

A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

As mentioned earlier, traditionally, a primary device may be used to communicate and interface with chatbots. The primary device may be a mobile device, a desktop, a smart phone, or a variety of other electronic devices. In some embodiments, the primary devices may be used to establish a customer support session such as between a user, starting with a chatbot interface. In these scenarios, there may be long wait times prior to beginning a customer support session. To compound the problem, the primary device may have to be switched on and off to complete the interaction. Unfortunately, the latter may also result in interrupted connections such that the process have to be restarted again. This unexpected disruption may cause the primary device to lose its place in a communication queue and the session history may be lost. In some scenarios, restarting the process may require a new representative to take over the previous interaction without the required expertise or the knowledge of prior user communication and history. This may adversely affect the result, user satisfaction and the completion time. In certain cases, the interaction may have been escalated to supervisory or more expert representatives with the correct authority or expertise. Consequently, in these cases, getting assigned to a new representative that may not have sufficient background or knowledge to assist the process may also affect the overall result of the interaction. To resolve these issues, a process 200 is provide in FIG. 2.

Figure 2:
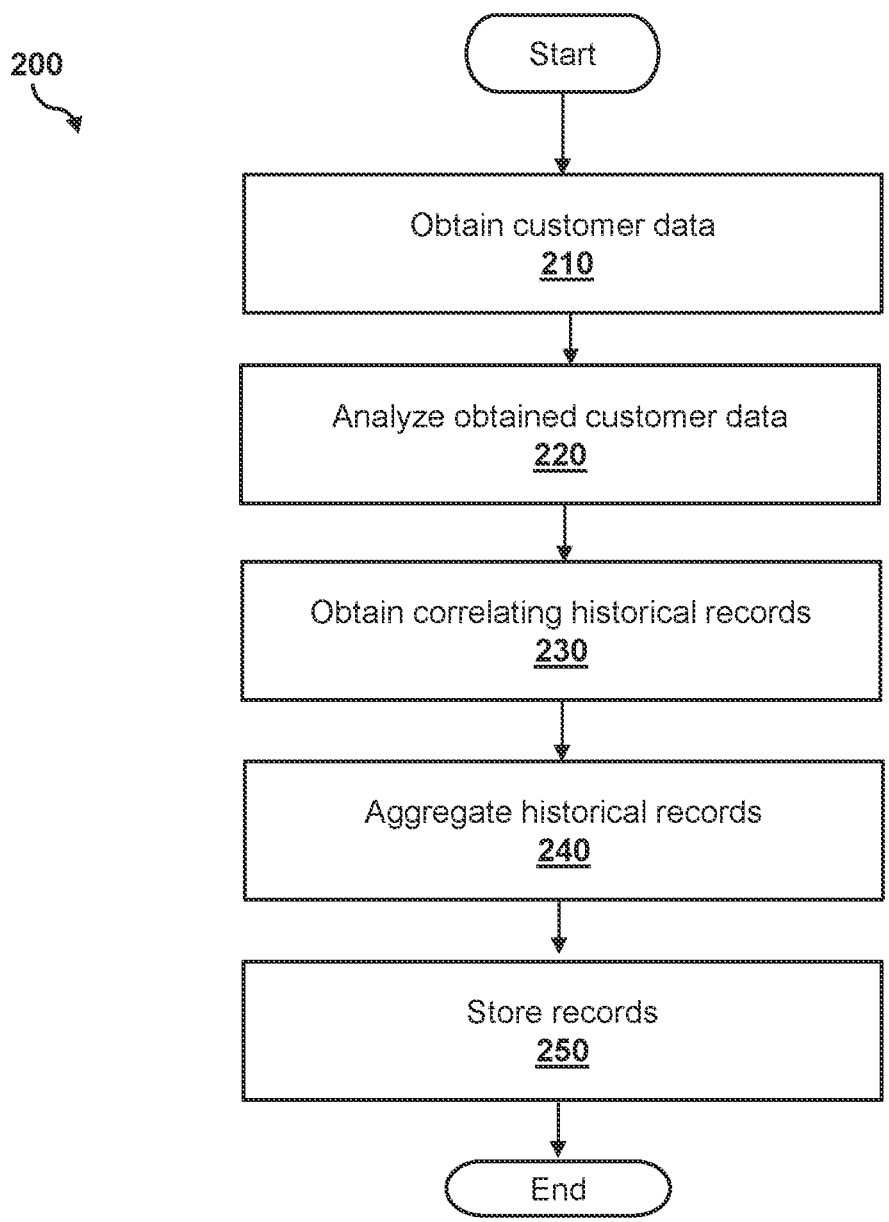
FIG. 2 provides an operational flowchart for reestablishing an interrupted session, according to one embodiment.

FIG. 2 provides a flowchart depiction of an embodiment having a process 200 for seamlessly restoring an interrupted communication session. In one embodiment, this may be achieved by providing a historical reference across multiple applications and various types of customer services experiences to provide an aggregated historical record from the user's viewpoint. In one embodiment, the process provides for service engagements by means of associating an Internet of things (IOT) token that may be maintained locally within a user's network and shared between devices for specific temporal support. In one embodiment, the process 200 may be managed by an Artificial Intelligence (AI) based engine using one or more self-learning Machine Learning (ML) engines and models.

In Step 210, customer service data may be obtained or received relating to one or more customer service applications. In one embodiment, this may mean that a user or a group of users connect to the system (opt into module 150) and allow the system access to obtain information about a session during a current or future chat between the user and another device. The other device may be a third-party device associated with the customer service application being provided.

In one embodiment, the information may be captured by a system (module) that may reside on a particular device (local or remote) as designated by the user(s). In one scenario, this may be accomplished through a resident local application centralized on a particularly designated device and processed (as designated by the AI, the user or a network). The system may include or be in communication with one or more servers (local or remote) or a plurality of other devices connected via the network.

In Step 220, the customer service data may be optionally analyzed. This can be done by reviewing the context of the communication captured. Other data may also be obtained and factored in to provide the analysis. The captured and analyzed information may comprise a variety of different data. This may not be limited to but can include speech to text summary, images captured or uploaded, or state of one or more tokens obtained from a backend vendor during the communication.

In Step 230, historical records may be obtained for one or more customer(s) relating to that customer's service experience. This correlating historical records may be based on the received or obtained customer service data (and optionally analyzed). In different embodiments, the historical records may pertain to specific customer(s), or a group of customers or customers with similar needs or service records. When analysis is conducted in Step 220, the historical data may also be considered so Steps 220 and 230 can be performed simultaneously.

In Step 240, an aggregate may be generated relating to the historical records obtained such as for a specific customer (or alternatively of several or other specific customers) based on customer service experience previously obtained and analyzed.

In Step 250, the aggregate historical record of customer service experiences may be stored. This may then be used for establishing context for future communications. It may also be used by AI (or by self-learning machine learning engines) to capture pertinent information during future communications or in case of missing information when reconnecting and reestablishing an interrupted prior session.

In this way, process 200 provides embodiments restoring an interrupted communication session. In one embodiment, as reflected by the steps 210-250, information is obtained from a user or user device regarding communication interface and network information required for the user to communicate from a user device with another device. The user communication is then captured between a current session using the user device and another device. The context of the captured communication is then determined, and a token is associated with it. The information relating to the current session and its context as well as the associated token are stored. This stored information is used to reestablish a new session when the current session is terminated or interrupted prior to resolution. The new session uses the stored information to reestablish communication at the exact process stage where interruption occurred.

In one embodiment, a system, a method and a program product is provided for restoring an interrupted communication session. The system includes one or more processors, one or more computer-readable memories and one or more computer-readable storage media and program instructions, stored on at least one of the one or more storage media for execution by at least one of the one or more processors via at least one of the one or more memories, to obtain a user's communication interface and network information required for the user to communicate from a user device with another device and to capture a user communication of a current session between said user device and the another device. It also comprises program instructions to determine communication captured of the current session and associating a token to the user communication captured and to store information to reestablish a new session when the current session is terminated or interrupted prior to resolution. The new session uses the stored information to reestablish communication at an exact process stage of the current session that is interrupted or terminated.

Figure 3:
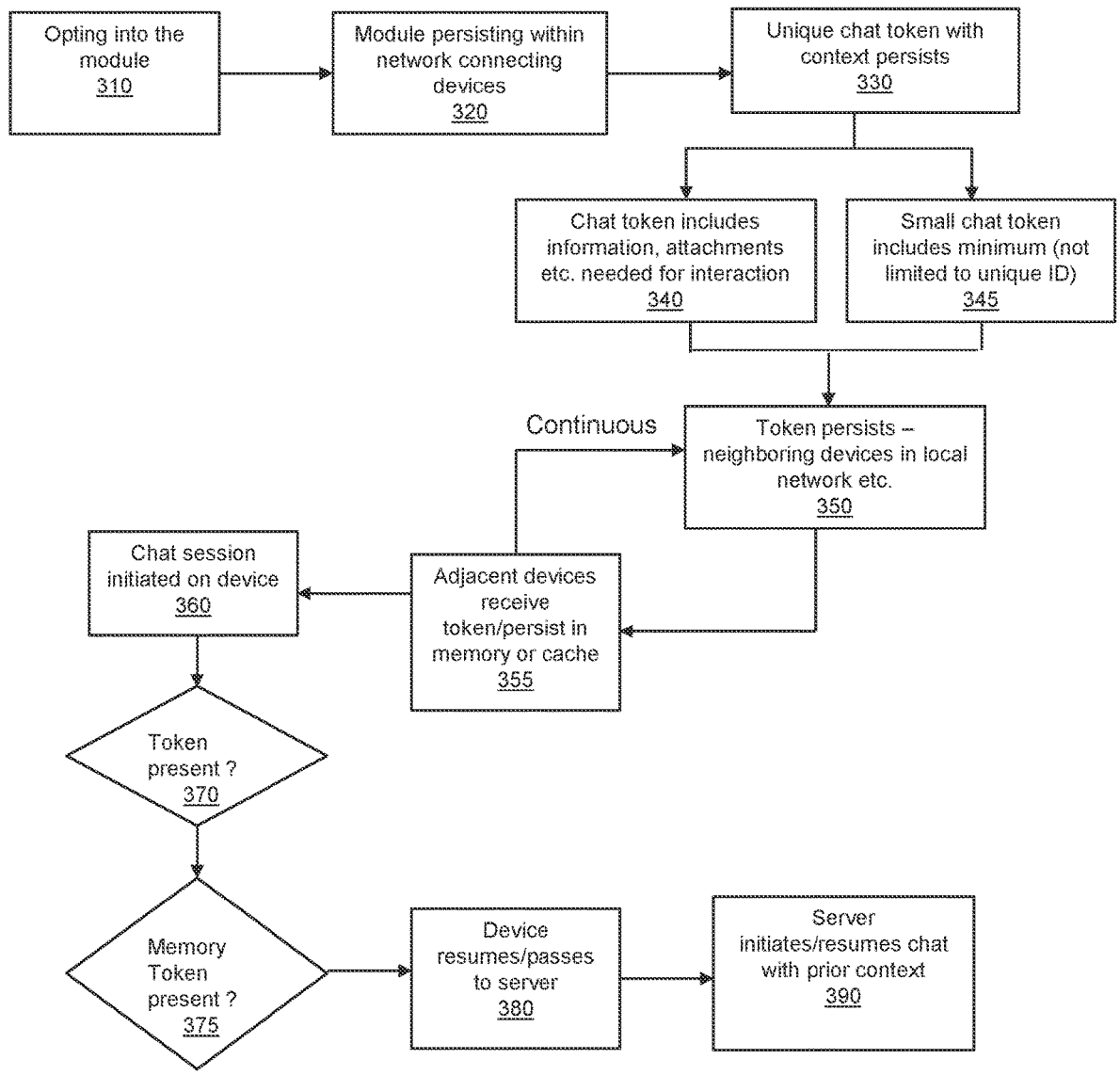
FIG. 3 provides an operational flowchart for restoring an interrupted session according to another embodiment.

FIG. 3 provides a flowchart relating to a process 300 relating to another embodiment of the present invention. In Step 310, the dynamic support management module 150 of FIG. 1 may be used. In one scenario, this can be performed by the user opting into the module.

As shown in Step 320, this provides the system access to session information captured during a user communication with a third-party device. The user or third-party device can be defined as any electronic device as can be appreciated by those skilled in the art. These may include mobile devices, wearables, desktops, virtual reality (VR) devices and the like. These devices may be in communication with another through a local (and remote) network such as those used by Internet of Things (IOT) systems such as used by a user. In one embodiment, the module 150 may reside as a local application centralized on a given device possessed by the user or the network.

In Step 330, the user begins a chat interaction through one or more means of communication. In one embodiment, when a chatbot session (or communication with support) may be initiated, the system begins capturing the context through a third party (vendor) agnostic token that is stored locally. This provides a unique chat token with an associated context that will persist over time. This token may include a variety of information. For example, the token may include:

Speech to text summarization,
Captured Information about the agent via keyword Analysis,
Extension,
Shared/Uploaded images/docs, and
State or unique token from backend vendor system representing status/progress.

As shown In Steps 340/345, there may be one or more tokens provided. In one embodiment, there may be one token and different tokens may be dedicated to different types of interaction. A token may be related to speech to text information, images shared or uploaded and a state unique token representing a status progress. In addition, a large chat token (340) may include more pertinent information and any attachments needed for the interaction. For example, a small chat token 345 may include only minimum information 345 (not limited to but can include unique identifications (ID)).

During the time when the user is interacting through the communication means (interfacing with support), the module may detect a support interaction. This information may be obtained from a variety of means. For example, consider the following scenarios:

Chat: Infrequent Chatbot usage, Site URL, HTML Interaction, Designated support sites, Global support payloads/URLs
Phone: Speech to Text, Designated Support Numbers, Detection of user IVR Interaction In one embodiment, during the interfacing, any information that may be detected unfilled (unfilled slots that weren't gathered automatically gathered such as by the user) will be provided. This is especially the case when using AI and self-learning machine learning engines. In addition, any manual additions such as any custom additions or components added by the user (or device etc.) may be added to a global token payload. The module may then also determine any unfilled slots (information) and notify the user based on slot incompleteness and a need to obtain the information. In one embodiment, an incomplete slot (required information missing) may prompt the user either through push notification (mobile, SMS, etc.) that it would be wise to gather/ask for the given information from the support. Some of the information may be obtained (step executed) only when a human may be online or accessible (AI will make it easier to have less of these steps in certain cases), while other information and steps may be automatically capture or provide for the given data.

In one embodiment, any tokens appended with the missing data and a state of maximum completeness may be targeted. Any tokens created by the user may have a dynamic or static expiration time based on context, fields, selections, dollar amount or other relevant support value. (A token has an expiration date). A nonexpired token persists and may be stored to a local device as a short-term cookie to assist further future communications.

In Step 350, for all the tokens where an expiration hasn't been reached, token persists (until expires). In one embodiment a variety of tools can be sued for this such as through Bluetooth, Wi-Fi, RFID, NFC or even neighboring devices in the local network or in a social local network. In one embodiment, as shown at 355, adjacent devices may also receive to token to allow it to persist. In one embodiment, Steps 350/355, may further be enhanced by storing the token to local opt-ed in devices as a short-term local cookie to assist with further communications.

The tokens appended with the missing data and/or a state of maximum completeness may be targeted. The token the user creates may have a dynamic or static expiration time based on context, fields, selections, dollar amount or other relevant support value. If the expiration hasn't been reached, the token persists and may be stored to local opt-ed in devices as a short-term local cookie to assist with further communications.

At any time in the future when a future conversation comes up surrounding the token, any household device that has received the temp token may present it for easy consumption or use for re-engaging with last steps or follow-up.

In this way, once a session (communication is disrupted) and/or for any reason terminated, a new session can be reinitiated as in Step 360 on any device and be able to resume the session at time of disruption or termination of the old one. Consequently, at a future time, when a future conversation comes up surrounding the token, any household device that has received the temp token may present it for easy consumption or use for re-engaging with last steps or follow-up. Consequently, when a future conversation comes up surrounding the token, any household device that has received the temp token may present it for easy consumption or use for re-engaging with last steps or follow-up. This is shown in more detail in Steps 370-390.

In Steps 370/375, the local token may be retrieved directly or from memory and any in initiating device resumes or passes the token (a cookie) to a communication server in Step 380. In Step 390, the server will initiate or reconnect the chat instance with the prior context to maintain space.

In an alternate embodiment, the system and module can be used to enhance a user's further experiences. For example, I one scenario, the user purchases or acquires a new device and brings it online. For ease of understanding, in this example, the device is a new virtual reality (VR) headset device. The user then attempts to engage a primary company providing services to the new device for support pertaining to older customer experience(s) on previous platforms or other self-owned devices. This would allow for the new VR headset to experience the previous planforms data within a new and novel way. Regardless, the customer data utility and customer privacy will be maintained throughout the entire customer support experience, regardless of the amount of device switching involved.

The descriptions of the various embodiments of the present invention have been presented for purposes of illustration but may be not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for restoring an interrupted communication session, comprising:

obtaining communication interface and network information required for a user to establish communicate from a user device with another device;

capturing a user communication of a current session between said user device and said another device;

determining context of communication captured of said current session and associating a token to said user communication captured;

obtaining a plurality of historical records related to previous interactions for said user device;

obtaining a plurality of historical records related to other devices previously engaged in similar communication types of transaction similar to said current session;

aggregating the plurality of historical records related to previous interactions with said user device and the plurality of historical records related to other devices previously engaged in similar communication types;

analyzing said aggregate of the plurality historical records;

storing said information relating to said current session and related context, analysis of the historical records aggregate, as well as said token; and using stored information to reestablish a new session when said current session is terminated or interrupted prior to completion or resolution, wherein said new session uses said stored information to reestablish communication at an exact process stage of said current session that was terminated or interrupted.

2. The method of claim 1, wherein historical record of previous user interaction is retrieved between said user and said other device is retrieved.

3. The method of claim 2, wherein said historical record retrieved is between said user and a second device, wherein said second device is different than said another device.

4. The method of claim 2, wherein said token is a third party agnostic token.

5. The method of claim 4, wherein said third party is a vendor and said third party is associated with said second device.

6. The method of claim 2, further comprising generating an aggregate historical record of a customer service experience based on a received customer service data associated with information retrieved for said user and user device; and storing said aggregate historical record generated.

7. The method of claim 2, wherein said user device is associated with a customer service application configured to provide customer service to said user using said another device.

8. The method of claim 7, wherein a plurality of user devices are provided and each of said plurality of user devices are associated with a plurality of customer service applications.

9. The method of claim 7, further comprising retrieving from a historical record application customer service data, wherein said historical record application is configured to receive a plurality of customer service applications.

10. The method of claim 1, wherein said token includes speech to text information, images shared or uploaded and a state unique token representing a status progress.

11. The method of claim 1, wherein said token has a dynamic or static expiration time based on any of the context, fields, dollar amount or other relevant user selections.

12. The method of claim 11, wherein a token has an expiration date; and any nonexpired token persists and is stored to a local device as a short term cookie to assist further future communications.

13. A computer system for restoring an imem1pwd communication session, comprising;

one or more processors, one or more computer-readable memories and one or more computer-readable storage media;

program instructions, stored on at least one of the one or more storage media for execution by at least one of the one or more processors via at least one of the one or more memories, to obtain a user's communication interface and network information required for said user to communicate from a user device with another device;

program instructions, stored on at least one of the one or more storage media for execution by at least one of the one or more processors via at least one of the one or more memories, to capture a user communication of a current session between said user device and said another device;

program instructions, stored on at least one of the one or more storage media for execution by at least one of the one or more processors via at least one of the one or more memories, to obtain a plurality of historical records related to previous interactions for said user device;

program instructions, stored on at least one of the one or more storage media for execution by at least one of the one or more processors via at least one of the one or more memories, to obtain a plurality of historical records related to other devices previously engaged in similar communication types of transaction similar to said current session;

program instructions, stored on at least one of the one or more storage media for execution by at least one of the one or more processors via at least one of the one or more memories, to aggregate the plurality of historical records related to previous interactions with said user device and historical records related to other devices previously engaged in similar communication types;

program instructions, stored on at least one of the one or more storage media for execution by at least one of the one or more processors via at least one of the one or more memories, to analyze said aggregate of the historical records;

program instructions, stored on at least one of the one or more storage media for execution by at least one of the one or more processors via at least one of the one or more memories, to determine communication captured of said current session and associating a token to said user communication captured; and program instructions, stored on at least one of the one or more storage media for execution by at least one of the one or more processors via at least one of the one or more memories, to store information relating to said current session and related context, analysis of the historical records aggregate, as well as said token to reestablish a new session when said current session is terminated or interrupted prior to resolution, wherein said new session uses said stored information to reestablish communication at exact process stage of said current session that is interrupted or terminated.

14. The computer system according to claim 13, wherein historical record of previous user interaction is retrieved between said user and said other device is retrieved.

15. The computer system according to claim 14, wherein said historical record retrieved is between said user and a second device, wherein said second device is different than said another device.

16. The computer system according to claim 14, wherein said token is a third party agnostic token.

17. The computer system according to claim 13, wherein said token includes speech to text information images shared or uploaded and a state unique token representing status progress.

18. The computer system according to claim 13, wherein said token has a dynamic or state expiration time based on any of the context, fields, dollar amount or other relevant user selection.

19. The computer system according to claim 18, wherein any nonexpired tokens persists and is stored to a local device as a short term cooked to assist further future communications.

20. A computer program product for restoring an interrupted communication session, the computer program product comprising:

one or more computer readable storage media;

program instructions, stored on at least one of the one or more storage media for execution by at least one of the one or more processors via at least one of the one or more memories, to obtain said user's communication interface and network information required for said user to communicate from a user device with another device;

program instructions, stored on at least one of the one or more storage media for execution by at least one of the one or more processors via at least one of the one or more memories, to capture a user communication of a current session between said user device and said another device;

program instructions, stored on at least one of the one or more storage media for execution by at least one of the one or more processors via at least one of the one or more memories, to obtain a plurality of historical records related to previous interactions for said user device;

program instructions, stored on at least one of the one or more storage media for execution by at least one of the one or more processors via at least one of the one or more memories, to obtain a plurality of historical records related to other devices previously engaged in similar communication types of transaction similar to said current session;

program instructions, stored on at least one of the one or more storage media for execution by at least one of the one or more processors via at least one of the one or more memories, to aggregate the plurality of historical records related to previous interactions with said user device and historical records related to other devices previously engaged in similar communication types;

program instructions, stored on at least one of the one or more storage media for execution by at least one of the one or more processors via at least one of the one or more memories, to analyze said aggregate of the historical records;

program instructions, stored on at least one of the one or more storage media for execution by at least one of the one or more processors via at least one of the one or more memories, to determine communication captured of said current session and associating a token to said user communication captured; and program instructions, stored on at least one of the one or more storage media for execution by at least one of the one or more processors via at least one of the one or more memories, to store information relating to said current session and related context, analysis of the historical records aggregate, as well as said token to reestablish a new session when said current session is terminated or interrupted prior to resolution, wherein said new session uses said stored information to reestablish communication at exact process stage of said current session that is interrupted or terminated.

\* \* \* \* \*